United States Patent [19]

Mallikarjun et al.

[11] Patent Number: 5,639,801
[45] Date of Patent: Jun. 17, 1997

[54] PROCESSING OF ANHYDRIDE-CONTAINING THERMOPLASTIC RESINS

[75] Inventors: Ramesh Mallikarjun, Exton; William J. Cleland, Thorndale, both of Pa.

[73] Assignee: Nova Chemicals Inc., Leominster, Mass.

[21] Appl. No.: 443,947

[22] Filed: May 18, 1995

[51] Int. Cl.$^6$ ...................................... C08J 11/04
[52] U.S. Cl. ................ 521/43.5; 521/40.5; 521/42; 528/272; 528/288; 528/291; 528/306; 264/8; 264/12; 264/13; 264/14; 264/41; 264/45.1; 264/45.7; 264/45.9; 264/54
[58] Field of Search ................ 521/40.5, 42, 43.5; 528/272, 288, 291, 306; 264/8, 12, 13, 14, 41, 45.1, 45.7, 45.9, 54

[56] References Cited

U.S. PATENT DOCUMENTS

| | | | |
|---|---|---|---|
| 3,840,499 | 10/1974 | Di Giullo | 260/78.5 |
| 4,404,322 | 9/1983 | Saito et al. | 525/74 |
| 4,588,754 | 5/1986 | Liu | 521/92 |
| 4,618,655 | 10/1986 | Dehm et al. | 525/344 |
| 4,695,594 | 9/1987 | Pressman | 521/92 |
| 4,703,105 | 10/1987 | Allada | 528/483 |
| 4,933,395 | 6/1990 | Canova et al. | 525/374 |
| 4,940,472 | 7/1990 | Hay, II et al. | 55/195 |
| 4,952,672 | 8/1990 | Moore et al. | 528/481 |
| 4,994,217 | 2/1991 | Banevicius et al. | 264/45.9 |
| 5,102,591 | 4/1992 | Hasson et al. | 264/45.9 |
| 5,204,410 | 4/1993 | Banevicius et al. | 525/132 |
| 5,442,041 | 8/1995 | Mallikarjun et al. | 528/483 |

OTHER PUBLICATIONS

Heck et al., "Blowing Agents", *Encyclopedia of Polymer Science & Technology* vol. 2, pp. 438–443.

Hurnick "Chemical Blowing Agents", *Plastic Additives Handbook*, 3rd Edition, Chapter 16, pp. 811–832 (1990).

"Update: Blowing Agents", *Plastics Compounding* pp. 64–72, (1980).

*Primary Examiner*—James J. Seideck
*Assistant Examiner*—Duc Truong
*Attorney, Agent, or Firm*—Kenneth H. Johnson

[57] ABSTRACT

An anhydride-containing thermoplastic resin such as a styrene maleic anhydride copolymer is processed in a vented extruder in the present of a nitrogenous chemical blowing agent to both imidize at least a portion of the anhydride groups and remove volatile residues such as unreacted styrene monomer from the resin.

5 Claims, No Drawings

PROCESSING OF ANHYDRIDE-CONTAINING THERMOPLASTIC RESINS

FIELD OF THE INVENTION

This invention relates to methods for processing thermoplastic resins which certain anhydride functional groups. More particularly, the present invention pertains to an extrusion process wherein the concentration of volatile residues in such resins may be reduced simultaneous with imidization of the anhydride functional groups.

BACKGROUND OF THE INVENTION

In manufacturing thermoplastic resin compositions, it is well known that free, unpolymerized monomer often remains absorbed within the thermoplastic resin produced due to the fact that complete monomer polymerization (particularly monomers such as styrene) is impractical to achieve on an industrial scale. Additionally present may be minor amounts of other organic species such as solvents, oligomers, catalyst, or volatile condensation products. Such substances may be detrimental to the ultimate product formed from the thermoplastic resin by reason of off-taste, off-odor, toxicity, or degradation of physical properties via plasticization, depolymerization, and so forth. Additionally, it is expected that government regulatory agencies may eventually establish maximum permissible levels of various monomers, including styrene, in packaging materials intended to contact food, beverages, pharmaceuticals, and cosmetics on the ground that excess levels represent an unacceptable health risk.

It is also known that the chemical conversion of anhydride groups in a copolymer into cyclic imide groups can provide imide copolymers having higher glass transition temperatures than the corresponding anhydride-containing copolymers, wherein the glass transition temperature increases with increasing imide content. This enhanced transition glass temperature is a very useful and desirable feature for thermoplastic polymers since improved properties such as higher heat distortion resistance and the like can be realized. Various methods have therefore been developed for the reaction of ammonia, amines, or amides with anhydride-containing thermoplastic resins including, for example, the procedures described in U.S. Pat. Nos. 3,840,499 (DiGullo), 4,404,322 (Saito et al.), 4,618,655 (Dehm et al.), and 4,933,395 (Canova et al.).

The development of a process which is capable of simultaneously converting anhydride groups in a thermoplastic resin to imide groups while reducing the level of volatile residues in said resin would therefore be of great interest and utility.

SUMMARY OF THE INVENTION

This invention provides a method of reducing the level of volatile residues in an anhydride-containing thermoplastic resin and imidizing said anhydride-containing thermoplastic resin, said method comprising the steps of:

(a) delivering the anhydride-containing thermoplastic resin and a nitrogenous chemical blowing agent to an extruder equipped with one or more vents;

(b) extruding the anhydride-containing thermoplastic resin while applying a vacuum at said vents at a temperature to (i) transform the nitrogenous chemical blowing agent into decomposition products, (ii) react at least a portion of said decomposition products with the anhydride-containing thermoplastic resin to convert at least a portion of the anhydride groups of the anhydride-containing thermoplastic resin to imide groups, generating water as a by-product, and (iii) remove through said vents a gaseous mixture comprising at least a portion of the volatile residues and an in situ generated stripping agent selected from the group consisting of the water generated by imidization and another portion of said decomposition products, thereby forming a purified imidized polymeric composition; and (c) recovering the purified imidized polymeric composition in solid unfoamed form.

DETAILED DESCRIPTION OF THE INVENTION

Anhydride-containing thermoplastic resins useful in the present invention are the high polymeric substances that contain cyclic anhydride groups and that soften or melt when exposed to heat and return to their original solid condition when cooled to room temperature. The anhydride groups may be incorporated into the polymer backbone or may be pendant to said backbone (as a result of grafting, for example). It is particularly preferred that the resins are ones which customarily contain free styrene monomer and contain at least about 10 percent by weight of polymerized styrene together with one or more copolymerized anhydrides and, optionally, other copolymerizable comonomers such as, for example, styrene/maleic anhydride (SMA resins), styrene/maleic anhydride/acrylonitrile terpolymers, and the like. Especially suitable for use are copolymers of styrene and maleic anhydride containing from 0.1 to 30 weight percent polymerized maleic anhydride such as the "Dylark" resins sold commercially by ARCO Chemical Company.

Thermoplastic resins within the scope of this invention may also contain an elastomer in the form of a synthetic or natural rubber component such as polybutadiene, polyisoprene, neoprene, nitrile rubbers, styrene-butadiene copolymers (block or random), acrylonitrile-butadiene copolymers, ethylene-propylene copolymers, ethylene-propylene-diene terpolymers, chlorinated rubbers, etc. which are used to strengthen or toughen such resins. This rubber component may be incorporated into the thermoplastic resin by any of the methods well known to those skilled in the art, e.g., solution, mass or emulsion graft polymerization of at least some of the monomers of the thermoplastic resin in the presence of the rubber and subsequent blending of the grafted rubber and optionally additional matrix polymer by solution or melt blending techniques; or merely blending by such techniques the rubber and the styrenic resin. Especially preferred are polyblends derived by the first technique. Generally, the rubber component may comprise from 0 to about 25% and preferably from 5 to about 10% by weight of the thermoplastic resin.

Any of the other known anhydride-containing thermoplastic resins capable of being extruded may also be processed in accordance with the present invention in order to reduce the concentration of volatile impurities contained therein and to convert at least a portion of the anhydride groups to imide groups.

In the process of this invention, it has been discovered that the use of a nitrogenous chemical blowing agent during extrusion of an anhydride-containing thermoplastic resin is an effective and convenient method for lowering the concentration of volatile organic substances such as unreacted monomer. In general, substances having molecular weights less than about 400 and/or boiling points at atmospheric pressure less than about 250° C. may be removed to a significant degree from thermoplastic resins using the present invention. Without wishing to be bound by theory, it is believed that such reduction is facilitated by the ease with which the chemical blowing agent may be intimately combined with the thermoplastic resin during a pre-extrusion dry or tumble blending step or during the extrusion process itself. An advantage of the present invention is that the use of a chemical blowing agent permits a reduction in the number of ampere hours required to extrude the thermoplastic resin. It is believed that this effect is attributable to plasticization of the thermoplastic resin by the chemical blowing agent and/or the decomposition products generated therefrom. Another advantage is that an extrusion step is typically practiced at some point during the course of existing thermoplastic resin manufacturing operations; adoption of the present invention thus would not require extensive retrofitting or replacement of present facilities.

In addition to lowering the concentration of volatile residues in the thermoplastic resin, the present invention also accomplishes imidization of at least a fraction of the anhydride groups. Such imidization, and the resulting favorable improvement in glass transition temperature and related properties such as heat distortion resistance, does not occur with other types of chemical blowing agents such as those which generate carbon dioxide as the only gaseous product upon decomposition. Without wishing to be bound by theory, it is believed that the dual activity of the nitrogenous chemical blowing agent may be attributable to the fact that such agents form reactive nitrogen-containing species (e.g., ammonia, amines) as well as, in most cases, inert (nonreactive) gases such as carbon dioxide, nitrogen, and the like in situ at elevated temperatures. Thus, a portion of the decomposition products reacts with the anhydride groups to form imides while another portion of the decomposition products assists in removal of the volatile residues from the thermoplastic resin. Additionally, the water formed as a by-product of imidization can also provide a stripping action helping to promote volatile residue removal.

The chemical blowing agents suitable for use in the present invention may be any nitrogen-containing chemical capable of generating ammonia ($NH_3$), amine ($RNH_2$), or an equivalent thereof when subjected to the extrusion conditions of the invention. Additionally, the nitrogenous chemical blowing agent may produce $CO_2$, $H_2O$, $N_2$, or other gases as well as non-volatile residues (e.g., inorganic salts and the like) upon decomposition. The two classes of materials especially preferred for use as the nitrogenous chemical blowing agent are hydrazine-based chemical blowing agents and ammonium-based chemical blowing agents.

Hydrazine-based chemical blowing agents are well known and are readily available from commercial sources. Especially preferred for use are azo-containing compounds such as azodicarbonamide (1,1-azobisformamide or ABFA), which is synthesized in a two stage process from hydrazine and urea. Azodicarbonamide has a decomposition temperature in the range of about 195° C. to 215° C. with a gas yield of about 220 mL/g. Modified azodicarbonamides, i.e., azodicarbonamides containing various additives such as "kickers" (activators), dispersing agents, auxiliary blowing agents such as sulfahydrazides and the like may also be utilized to advantage. It is highly desirable to select a chemical blowing agent which will decompose at the temperature which the thermoplastic resin experiences during extrusion, which typically is from about 200° C. to 300° C. The onset of chemical blowing agent decomposition may, however, be significantly lower than the extrusion temperature (for example, 100° C. to 200° C.) without adverse effect on the level of volatile residue reduction or imidization achieved.

Other hydrazine-based chemical blowing agents suitable for use in the process of the invention include, but are not limited to, 4,4'-oxy bis(benzenesulfonhydrazide), diphenylsulfone-3,3'-disulfonhydrazide, trihydrazinotriazine,and the like.

Ammonium-based chemical blowing agents include inorganic ammonium compounds, with ammonium salts being particularly suitable for use. In one desirable embodiment, the ammonium-based chemical blowing agent is an ammonium salt of carbonic acid or carbamic acid such as, for example, ammonium bicarbonate, ammonium carbonate, ammonium carbamate, and the like. Mixtures of different ammonium-based chemical blowing agents as well as mixtures of hydrazine-based and ammonium-based chemical blowing agents can advantageously be used.

The nitrogenous chemical blowing agent may be combined or admixed with the anhydride-containing thermoplastic resin in any suitable physical form such as, for example, solid powder, pellets, granules, a dispersion or solution in an inert liquid (e.g., water) or with a diluent such as silica or clay, or as a concentrate in a carrier polymer. Most preferably, however, the particle size of the chemical blowing agent is sufficiently small to facilitate uniform blending with the thermoplastic resin. Generally, an average particle size of less than 100 microns is preferred. If the thermoplastic resin being treated in accordance with the present invention is coming directly from a polymerization reactor, it will typically be desirable to first remove most of the solvent, unreacted monomer, water, and other volatile components by preliminary processing such as conventional devolatilization or filtration techniques. The thermoplastic resin thus will ordinarily have total volatile residue levels ranging from 500 to 10,000 ppm prior to treatment with the chemical blowing agent. The resin feed may be in solid particulate form (e.g., pellets, powder, beads, flakes, or reground material) or in liquid (molten) form.

The amount of chemical blowing agent employed should be sufficient to effect at least partial removal of the volatile residues in the thermoplastic resin and at least partial imidization of the anhydride groups in said resin during practice of the process of this invention. The optimum amount of chemical blowing agent will vary somewhat depending upon the level of impurities in the thermoplastic resin, the gas yield of the chemical blowing agent (which preferably is in the range of from 100 to 300 cubic cm per gram), processing temperature and pressure, extruder design, the desired level of imidization, the reactivities of the anhydride groups and the decomposition products derived from the blowing agent and other factors, but generally will be in the range of from about 0.5 to 10 weight percent based on the weight of the thermoplastic resin. Preferably, at least 1 weight percent chemical blowing agent is utilized.

While the manner in which the thermoplastic resin and chemical blowing agent are admixed is not critical, it is preferred to dry blend the components in advance of extrusion such that the chemical blowing agent is uniformly distributed through the thermoplastic resin (which typically is in particulate form). Alternatively, the components may be combined by separately feeding the chemical blowing agent and thermoplastic resin to the extruder such that mixing takes place in the extruder itself.

The chemical blowing agent may be introduced stepwise using, for example, multiple feed ports on the extruder. An essential step in the method of this invention is extruding the thermoplastic resin together with the chemical blowing agent in an extruder equipped with at least one vent (preferably, a plurality of vents). The extruder should be constructed of materials resistant to the decomposition products (e.g., ammonia) generated from the chemical blowing agent. The extrusion temperature is such as to effect decomposition of the chemical blowing agent. A vacuum is applied to the vent or vents during extrusion such that some fraction of the liberated decomposition products (and/or the water generated during imidization) is removed from the thermoplastic resin as a gaseous mixture together with at least a portion of the volatile residues.

Extrusion may be conducted using any known equipment for this operation, including single-screw and multiple screw extruders. A twin screw extruder is especially suitable for the removal of volatile impurities in accordance with the present invention. Suitable extruders include those incorporating one or more screws rotating in a horizontal cylindrical barrel with an entry port mounted over one end and a shaping die mounted at the discharge end. Additional feed ports may be positioned downstream of the first feed port.

As the admixture of thermoplastic resin and chemical blowing agent is transported downstream within the extruder, the thermoplastic resin component (which may preferably be in solid particulate form) is heated and melted by application of heat to the barrel of the extruder. Alternatively, the thermoplastic resin may be melted prior to combining with the chemical blowing agent within the extruder. For most thermoplastic resins, temperatures of from about 200° C. to 300° C. are sufficient for this purpose. If the thermoplastic resin to be purified is coming directly from a reactor wherein bulk or solvent polymerization has been performed, the resin may be maintained in the liquid state prior to and during extrusion. The vacuum vent or vents are preferably located at a point or points along the length of the extruder where at least a portion of the chemical blowing agent has undergone decomposition. The use of multiple vents is preferred in order to ensure that substantially all of the gaseous non-reactive decomposition products derived from the chemical blowing agent are removed before the melt enters the extruder die and is pelletized so as to avoid forming pellets containing voids. More complete removal of volatile impurities from the thermoplastic resin is also favored by the utilization of multi-vent extruders. Multiple stage extruders or a series of individual extruders may be effectively employed when practicing the process of this invention. The purified imidized polymeric composition exiting the extruder can be extruded into shapes or cut into pellets for further processing in accordance with conventional techniques. Any conventional hot or cold pelletizing or cutting system may be used to form pellets. Cold cutting systems include dicing, strand pelletizing and strand (forced conveyance) pelletizing systems. Hot cutting systems include water ring pelletizers, hot face pelletizers, underwater pelletizers and centrifuged pelletizers. The purified imidized polymeric composition is recovered in solid unfoamed form (i.e., the purified imidized polymeric composition is unexpanded, non-cellular, and non-porous and has a density near the maximum theoretically possible). The chemical blowing agent in the process of this invention thus is used to remove volatile impurities from the thermoplastic resin rather than for the conventional purpose of foaming or expanding the resin. For this reason, the extrusion conditions are selected so as to permit essentially all of the liberated gaseous decomposition products which have not reacted with the anhydride groups of the thermoplastic resin to escape from the purified imidized polymeric composition prior to cooling and recovery of the composition in solid form.

The degree of vacuum applied to the vent or vents of the extruder will depend on several factors, including extrusion temperature, the proportion of volatile impurities in the thermoplastic resin, and the amount and type of chemical blowing agent to be employed. In general, pressures of from about 1 to 200 torr are preferred.

The thermoplastic resin, while being combined and extruded with the chemical blowing agent, can also be formulated with other ingredients in order to incorporate such ingredients into the purified polymeric composition. These ingredients may be selected from among the conventional materials and additives commonly employed in thermoplastic resins such as plasticizers, mold release agents, melt viscosity reducers, colorants, stabilizers, flame retardants, antioxidants, fillers, reinforcing agents, lubricants, fragrances, and so forth. Other resins may also be blended with the thermoplastic resin during the process of this invention.

EXAMPLES

Controlled experiments were conducted using a lab scale 34 mm American Leistvitz counter-rotating twin screw extruder having a single vacuum vent. Dylark 480 resin, a copolymer of styrene and maleic anhydride available from ARCO Chemical Company having a residual styrene monomer level of 2304 ppm, was extruded at approximately 260° C. both with and without a hydrazine-based chemical blowing agent. Three types of hydrazine-based chemical blowing agents were employed: POROFOR TP KA 9149 (an azodicarbonamide available from Miles Inc.), FICEL EPA (a modified azodicarbonamide having a decomposition temperature of 190° C.–220° C. and a gas yield of 210 mL/g; available from Witco Corp.), and FICEL EPD (a modified azodicarbonamide having a decomposition temperature of 200° C. to 220° C. and a gas yield of 210 mL/g; available from Witco Corp.)

The results obtained (Table 1) confirm that the use of a hydrazine-based chemical blowing agent not only leads to a greater reduction in the level of residual styrene monomer than is observed in the absence of the blowing agent but also significantly increases the glass transition temperature of the resin (indicative of imidization of the anhydride groups). The presence of imide groups in the processed resin was confirmed qualitatively by infrared analysis.

TABLE I

| Example No. | Chemical Blowing Agent | Wt. % | Vacuum Level, torr | Residual Styrene, ppm | % Styrene Reduction | Tg,°C. (DSC) |
| --- | --- | --- | --- | --- | --- | --- |
| 1 | none | 0 | 50 | 665 | 71 | 131 |
| 2 | Porofor TPKA 9149 | 1 | 50 | 491 | 79 | 136 |

TABLE I-continued

| Example No. | Chemical Blowing Agent | Wt. % | Vacuum Level, torr | Residual Styrene, ppm | % Styrene Reduction | Tg,°C. (DSC) |
|---|---|---|---|---|---|---|
| 3 | Ficel EPA | 1 | 50 | 507 | 78 | 136 |
| 4 | Ficel EPD | 1 | 50 | 449 | 81 | 135 |

In another series of experiments, 3% ammonium carbonate was utilized as the nitrogenous chemical blowing agent. Extrusion of Dylark 480 P16 resin (a glass fiber-reinforced styrene maleic anhydride copolymer resin containing about 2300 ppm styrene) was performed using a 1.5" Sterling single screw extruder equipped with one vacuum vent. The melt temperature was 277° C.; the vacuum applied at the vent was 100 torr. Table II demonstrates effectiveness of the ammonium carbonate in both promoting the removal of residual styrene from the resin and increasing the glass transition temperature (imidization was confirmed by IR analysis). Imidization of the resin improved its heat distortion resistance, as indicated by the increase in DTUL.

TABLE II

| Example No. | 5 | 6 |
|---|---|---|
| Weight % Ammonium Carbonate | 0 | 3 |
| Residual Styrene Content, ppm | 799 | 265 |
| Tg (°C.) | 131 | 133 |
| Tensile Strength @ bk (psi) | 11,800 | 11,600 |
| Tensile Modulus (psi × 1000) | 860 | 870 |
| Elongation @ Break (%) | 2.49 | 2.56 |
| Flex Strength @ Break (psi) | 19,700 | 19,200 |
| Flex Elongation (%) | 3.04 | 3.12 |
| Flex Toughness (psi) | 37.4 | 37.3 |
| Flex Modulus (psi × 1000) | 768 | 741 |
| DTUL (unannealed ⅛") (°F.) | 248 | 253 |
| N. Izod (ft. lbs/in) | 1.9 | 1.8 |
| Ash Content (%) | 15.7 | 15.7 |
| Melt Flow "L" (gms./10 min) | 0.12 | 0.20 |

We claim:

1. A method of reducing the level of volatile residues in a styrene maleic anhydride copolymer resin and imidizing said styrene maleic anhydride copolymer resin, said method comprising the steps of:

(a) delivering the styrene maleic anhydride copolymer resin and from 0.1 to 10 weight percent, based on the weight of the styrene maleic anhydride copolymer resin, of a chemical blowing agent selected from the group consisting of azodicarbonamide, carbonic acid ammonium salts, carbamic acid ammonium salts, and mixtures thereof to an extruder equipped with one or more vents;

(b) extruding the styrene maleic anhydride copolymer resin while applying a vacuum at said vents of from 1 to 200 torr at a temperature of from 200° C. to 300° C. to (i) transform the chemical blowing agent into decomposition products comprising a mixture of a reactive nitrogen containing species and carbon dioxide, (ii) reacting at least a portion of said reactive nitrogen species with the styrene maleic anhydride copolymer resin to convert at least a portion of the anhydride groups of the styrene maleic anhydride copolymer resin to imide groups, generating water as a byproduct, and (iii) removing through said vents a gaseous mixture comprising at least a portion of the decomposition products and in situ water generated by imidization, thereby forming a purified imidized polymeric composition; and (c) recovering the purified imidized polymeric composition in the form of solid unfoamed pellets.

2. The method of claim 1 wherein the volatile residues are comprised of styrene monomer.

3. The method of claim 1 wherein the styrene maleic anhydride copolymer resin is comprised of 1 to 30 weight percent polymerized maleic anhydride and 70 to 99 weight percent polymerized styrene.

4. The method of claim 1 wherein the chemical blowing agent is comprised of ammonium carbonate.

5. A purified imidized polymeric composition produced by the process of claim 1.

* * * * *